US012788081B2

(12) United States Patent
Carloni et al.

(10) Patent No.: US 12,788,081 B2
(45) Date of Patent: Nov. 10, 2026

(54) PROTECTIVE COAT

(71) Applicant: PIP Manufacturing, Inc., Latham, NY (US)

(72) Inventors: Anna Katherine Carloni, Washington Township, OH (US); Jonathan Allen, Piqua, OH (US); Josée Lalonde, St-Louis de Gonzague (CA); Lisa Ann Cubas Ray, Centerville, OH (US)

(73) Assignee: PIP Manufacturing, Inc., Latham, NY (US)

( * ) Notice: Subject to any disclaimer, the term of this patent is extended or adjusted under 35 U.S.C. 154(b) by 0 days.

(21) Appl. No.: 19/045,981

(22) Filed: Feb. 5, 2025

(65) Prior Publication Data

US 2026/0223960 A1 Aug. 6, 2026

(51) Int. Cl.

*A41D 3/02* (2006.01)
*A41D 31/06* (2019.01)
*A62B 17/00* (2006.01)

(52) U.S. Cl.

CPC ............... *A41D 3/02* (2013.01); *A41D 31/06* (2019.02); *A62B 17/003* (2013.01)

(58) Field of Classification Search

CPC .......... A41D 3/02; A41D 31/06; A41D 31/08; A41D 27/04; A41D 13/00; A41D 3/00; A62B 17/003

See application file for complete search history.

(56) References Cited

U.S. PATENT DOCUMENTS 2,483,015 A * 9/1949 Levy ...................... A41D 27/04 2/93
3,013,276 A * 12/1961 Maxwell ................ A41D 27/10 D2/858
3,086,214 A * 4/1963 Lash ...................... A41D 13/02 D2/743
3,231,899 A * 2/1966 Seidel ...................... A41D 3/02 2/93
3,925,823 A 12/1975 Kupferman (Continued)

FOREIGN PATENT DOCUMENTS

AU 2005200963 A1 3/2005

OTHER PUBLICATIONS

International Searching Authority, "International Search Report and Written Opinion", From Application No. PCT/US2026/013844, Mailed Apr. 29, 2026, pp. 17.

*Primary Examiner* — Heather Mangine
*Assistant Examiner* — Raquel M. Weis
(74) *Attorney, Agent, or Firm* — Fredrikson & Byron, P.A.

(57) ABSTRACT

A protective coat is disclosed. The protective coat comprises an inner layer. The inner layer comprises a thermal layer that defines a body portion, a first sleeve portion, and a second sleeve portion. Each of the body portion, the first sleeve portion, and the second sleeve portion of the thermal layer comprise a thermal material, and a flexible panel attached to the thermal material. The inner layer further comprises a moisture barrier layer that is positioned over and attached to the thermal layer. The moisture barrier layer defines a body portion, a first sleeve portion, and a second sleeve portion. Each of the body portion, the first sleeve portion, and the second sleeve portion of the moisture barrier layer comprise a moisture barrier material, a flexible panel, and an overlay panel.

18 Claims, 10 Drawing Sheets

(56) References Cited

U.S. PATENT DOCUMENTS

| | | | | | |
|---|---|---|---|---|---|
| 4,670,913 | A * | 6/1987 | Morell | A41D 13/02 | 2/227 |
| 4,864,655 | A * | 9/1989 | McKenney | A62B 17/003 | 2/81 |
| 4,922,552 | A * | 5/1990 | Grilliot | A41D 13/0002 | 2/81 |
| 5,323,815 | A * | 6/1994 | Barbeau | D03D 15/283 | 2/81 |
| 5,527,597 | A * | 6/1996 | Stanhope | D02G 3/443 | 139/426 R |
| 5,685,015 | A | 11/1997 | Aldridge | | |
| 5,694,981 | A * | 12/1997 | Stanhope | A62B 17/003 | 442/190 |
| 5,819,316 | A * | 10/1998 | Aldridge | A41D 27/04 | 2/81 |
| 5,860,163 | A * | 1/1999 | Aldridge | A41D 31/065 | 2/81 |
| 5,920,905 | A * | 7/1999 | Aldridge | A41D 27/04 | 2/81 |
| 5,928,971 | A * | 7/1999 | Ellis | D03D 15/513 | 442/244 |
| 6,427,242 | B1 * | 8/2002 | Bush | A41D 27/02 | 2/87 |
| 6,799,331 | B2 * | 10/2004 | Griesbach, III | A41D 13/1209 | 2/92 |
| 6,978,481 | B2 * | 12/2005 | Mordecai | A41D 27/04 | 2/81 |
| 7,543,338 | B2 * | 6/2009 | Culhane | A41D 1/067 | 2/93 |
| 8,341,766 | B2 * | 1/2013 | Rodriguez | A41D 27/18 | 2/93 |
| 2002/0138893 | A1 * | 10/2002 | Culhane | A41D 3/00 | 2/84 |
| 2005/0204449 | A1 * | 9/2005 | Baron | D03D 15/49 | 2/69 |
| 2006/0105658 | A1 * | 5/2006 | Patz | D03D 15/513 | 442/181 |
| 2007/0026752 | A1 * | 2/2007 | Thiriot | A41D 31/08 | 442/76 |
| 2007/0137012 | A1 * | 6/2007 | Laton | A41D 31/08 | 28/167 |
| 2008/0134407 | A1 * | 6/2008 | Winterhalter | D04H 1/4342 | 2/243.1 |
| 2009/0178186 | A1 * | 7/2009 | Truesdale | D06M 15/423 | 2/81 |
| 2010/0043116 | A1 * | 2/2010 | Vereen | A41B 1/08 | 2/81 |
| 2010/0242151 | A1 * | 9/2010 | Mather | D04B 21/16 | 2/115 |
| 2012/0131734 | A1 * | 5/2012 | Sindicich | A41D 13/02 | 2/458 |
| 2012/0204313 | A1 * | 8/2012 | Evans | A41F 5/00 | 2/70 |
| 2012/0233748 | A1 * | 9/2012 | Curtis | A41D 13/00 | 2/455 |
| 2012/0260396 | A1 * | 10/2012 | Mordecai | A41D 31/06 | 2/97 |
| 2013/0014318 | A1 * | 1/2013 | Jourde | A63B 71/12 | 2/463 |
| 2013/0031703 | A1 * | 2/2013 | Curtis | A62B 17/003 | 2/455 |
| 2013/0205481 | A1 * | 8/2013 | Underwood | A41D 1/06 | 2/455 |
| 2013/0254980 | A1 * | 10/2013 | Underwood | A62B 17/003 | 2/458 |
| 2014/0000004 | A1 * | 1/2014 | Baron | D04B 21/207 | 2/69 |
| 2014/0033393 | A1 * | 2/2014 | Best | A41D 31/08 | 2/22 |
| 2014/0033410 | A1 * | 2/2014 | Curtis | A41D 13/0002 | 2/455 |
| 2014/0356574 | A1 * | 12/2014 | Conolly | B32B 5/026 | 204/192.15 |
| 2016/0059050 | A1 * | 3/2016 | Gomez | A62B 17/003 | 2/458 |
| 2017/0028669 | A1 * | 2/2017 | Regester | A41D 3/00 | |
| 2017/0074621 | A1 * | 3/2017 | Provencal | A41D 31/08 | |
| 2017/0120081 | A1 * | 5/2017 | Barbeau | A62B 17/005 | |
| 2017/0176146 | A1 * | 6/2017 | Böhringer | A41D 13/11 | |
| 2017/0340027 | A1 * | 11/2017 | Montoya | D04B 1/10 | |
| 2018/0146717 | A1 * | 5/2018 | Ballone | A41B 1/08 | |
| 2020/0268059 | A1 * | 8/2020 | Kraikhajornkitti | A41D 1/04 | |
| 2020/0282243 | A1 * | 9/2020 | Martinez | A41D 27/285 | |
| 2022/0307168 | A1 * | 9/2022 | Horne | A41B 9/12 | |
| 2023/0085498 | A1 * | 3/2023 | Colatruglio | A41D 13/002 | 2/458 |

* cited by examiner

U.S. Patent Nov. 10, 2026 Sheet 10 of 10 US 12,788,081 B2

PROTECTIVE COAT

TECHNOLOGICAL FIELD

Example embodiments of the present disclosure generally relates to a protective coat, and more particularly relates to a protective coat for firefighting equipment and other emergency response equipment.

BACKGROUND

Firefighting and other emergency responsibilities have a physically demanding profession that requires individuals to perform intense tasks in hazardous environments while wearing heavy and restrictive firefighting coats. The firefighting coats, while providing critical thermal and moisture protection, often limit mobility due to their rigid and bulky design. The rigidity and bulkiness of the firefighting coats can hinder movement, particularly in critical areas like the shoulders, arms, and torso, where flexibility is crucial for efficient task execution. Such limitation of the firefighting coats not only increases physical fatigue but also poses a safety risk, as restricted mobility can slow response times and reduce the firefighter's ability to adapt to rapidly changing environments. Prolonged use of the firefighting coats can lead to fatigue, musculoskeletal stress, and reduced effectiveness in high-pressure situations.

The inventors have identified numerous areas of improvement in the existing technologies and processes, which are the subjects of embodiments described herein. Through applied effort, ingenuity, and innovation, many of these deficiencies, challenges, and problems have been solved by developing solutions that are included in embodiments of the present disclosure, some examples of which are described in detail herein.

BRIEF SUMMARY

The following presents a simplified summary in order to provide a basic understanding of some aspects of the present disclosure. This summary is not an extensive overview and is intended to neither identify key or critical elements nor delineate the scope of such elements. Its purpose is to present some concepts of the described features in a simplified form as a prelude to the more detailed description that is presented later.

In an example embodiment, a protective coat is disclosed. The protective coat comprises a thermal layer and a moisture barrier layer. The thermal layer defines a body portion, a first sleeve portion, and a second sleeve portion. Each of the body portion, the first sleeve portion, and the second sleeve portion of the thermal layer comprise a thermal material and a flexible panel attached to the thermal material. Further, the moisture barrier layer is positioned over and attached to the thermal layer. The moisture barrier layer defines a body portion, a first sleeve portion, and a second sleeve portion. Each of the body portion, the first sleeve portion, and the second sleeve portion of the moisture barrier layer comprise a moisture barrier material, a flexible panel attached to the moisture barrier material, and an overlay panel that is positioned over the flexible panel and attached to the moisture barrier material.

In some embodiments, the protective coat further comprises an outer layer detachably attached over the inner layer.

In some embodiments, a top side and a bottom side of the overlay panel of the body portion of the moisture barrier layer is attached to the moisture barrier material of the moisture barrier layer. Further, a left side and a right side of the overlay panel of the body portion of the moisture barrier layer is unattached to the moisture barrier material of the moisture barrier layer to provide venting.

In some embodiments, a proximal side of an overlay panel of the first sleeve portion of the moisture barrier layer is attached to the moisture barrier material of the moisture barrier layer. Further, a distal side of the overlay panel of the first sleeve portion of the moisture barrier layer is unattached to the moisture barrier material of the moisture barrier layer to allow ventilation of air through at least a portion of the flexible panel of the first sleeve portion of the moisture barrier layer.

In some embodiments, each of the flexible panels of the body portions, the first sleeve portions, and the second sleeve portions of the moisture barrier layer are breathable and configured to block particulate matters from entering into the inner layer.

In some embodiments, each of the flexible panels of the body portions, the first sleeve portions, and the second sleeve portions of the moisture barrier layer has a flame resistance that meets or exceeds flame resistance requirements for ASTM D6413. Further, each of the flexible panels of the body portions, the first sleeve portions, and the second sleeve portions of the moisture barrier layer has an air permeability that is at least 4 CFM meets or exceeds air permeability requirements for ASTM D737.

In some embodiments, each of the flexible panels of the body portions, the first sleeve portions, and the second sleeve portions of the thermal barrier layer comprise aromatic polyamide fibers. In some embodiments, the moisture barrier layer is sewn to the thermal layer.

In some embodiments, each of the flexible panels of the body portions of the thermal barrier layer and the moisture barrier layer have a trapezoid shape.

In some embodiments, a length of the flexible panel of the first sleeve portion of the thermal layer is at least 80% of a length of the first sleeve portion of the thermal layer. In some embodiments, a length of the flexible panel of the body portion of the thermal layer is at least 20% of a length of the body portion of the thermal layer.

In some embodiments, the flexible panel of the first sleeve portion of the thermal layer is positioned on an underside of the first sleeve portion of the thermal layer. In some embodiments, the protective coat is a firefighting coat.

In another example embodiment, a method is disclosed. The method comprises steps of positioning a moisture barrier layer over a thermal layer. The thermal layer defines a body portion, a first sleeve portion, and a second sleeve portion. Each of the body portion, the first sleeve portion, and the second sleeve portion of the thermal layer comprise a thermal material and a flexible panel attached to the thermal material. Further, the moisture barrier layer is positioned over and attached to the thermal layer. The moisture barrier layer defines a body portion, a first sleeve portion, and a second sleeve portion. Each of the body portion, the first sleeve portion, and the second sleeve portion of the moisture barrier layer comprise a moisture barrier material, a flexible panel attached to the moisture barrier material, and an overlay panel that is positioned over the flexible panel and attached to the moisture barrier material.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1A:
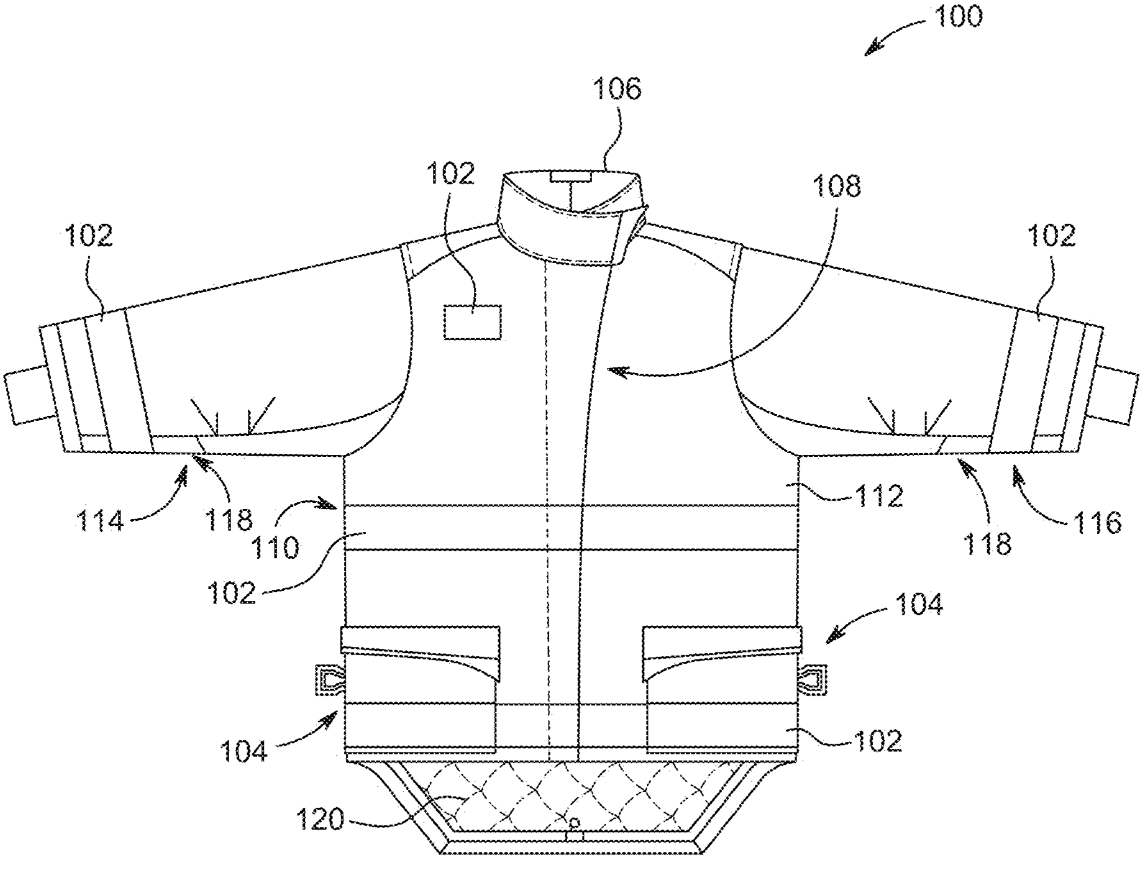
Figure 1B:
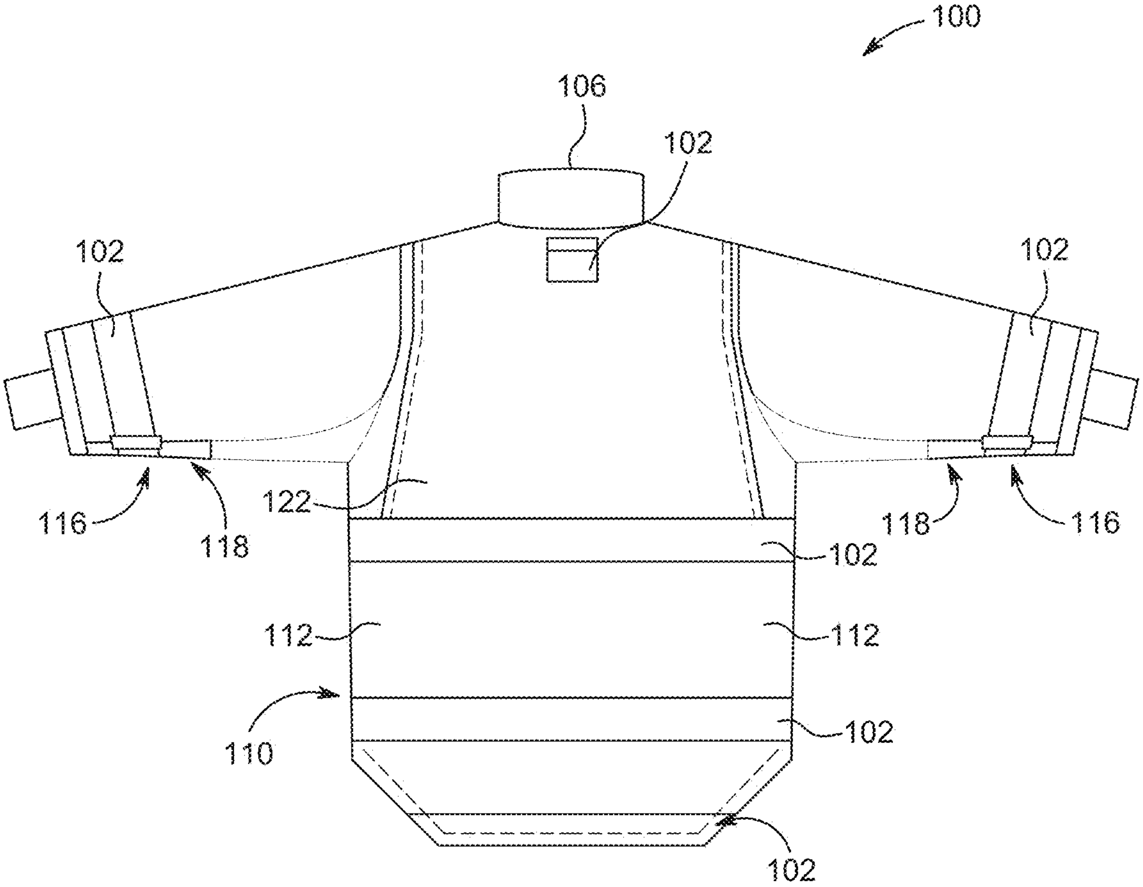
Figure 2A:
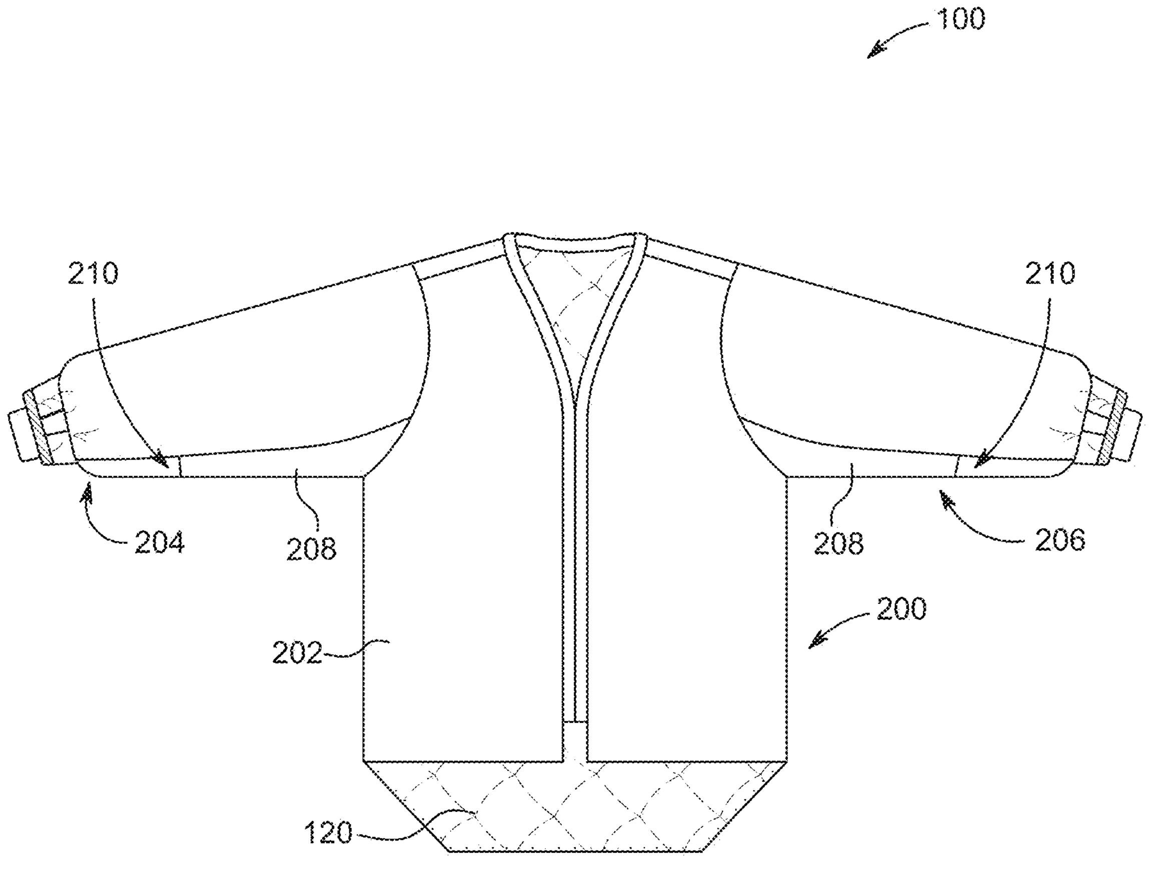
Figure 2B:
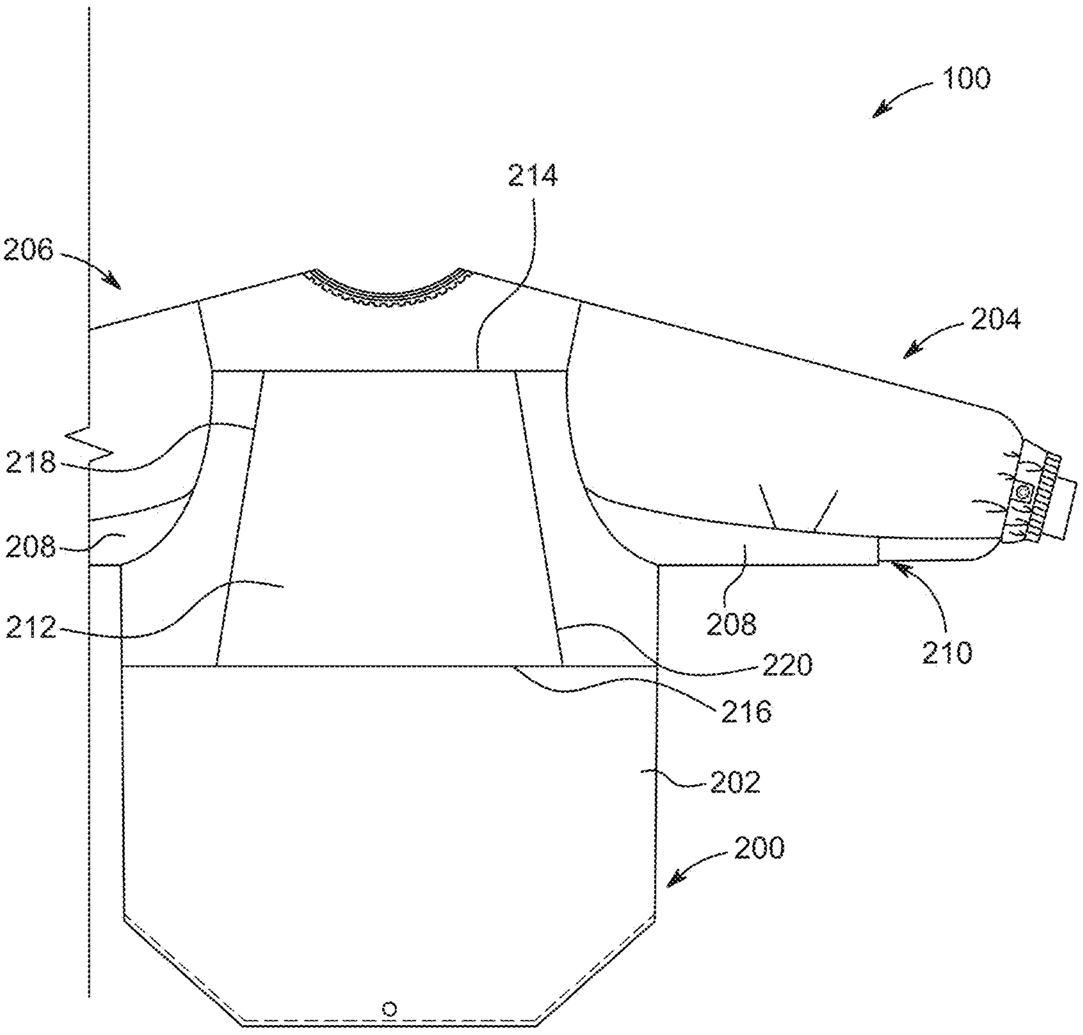
Figure 2C:
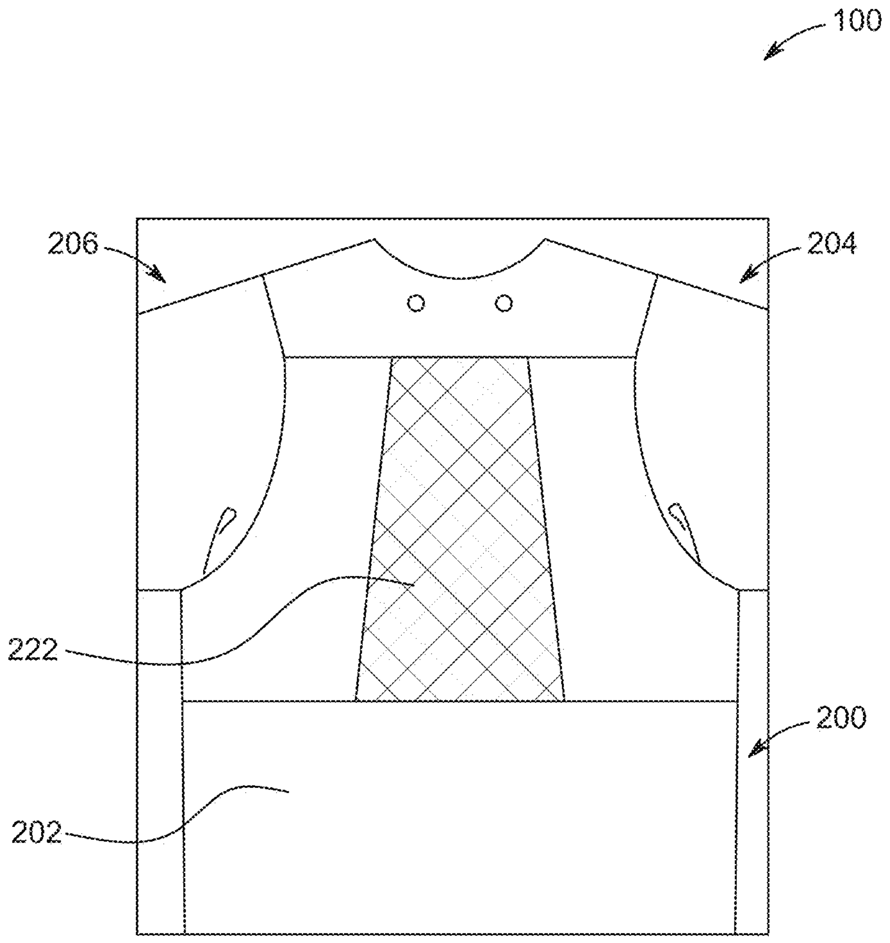
Figure 2D:
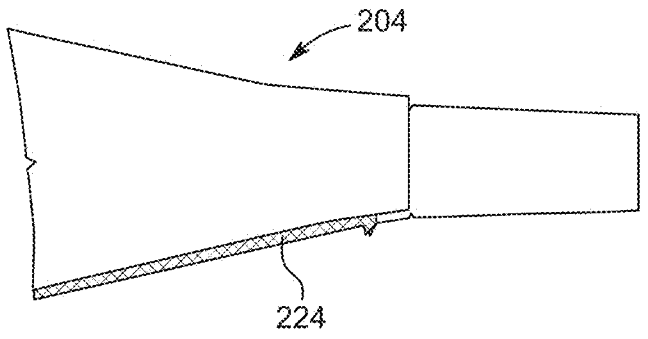
Figure 3A:
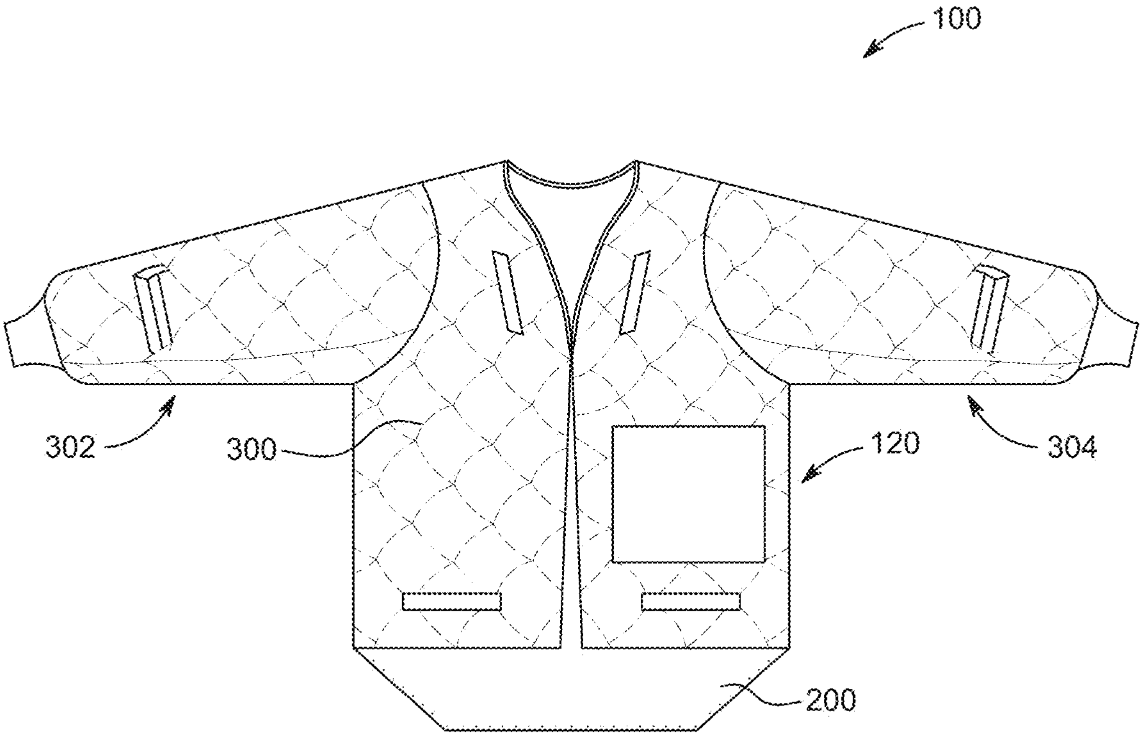
Figure 3B:
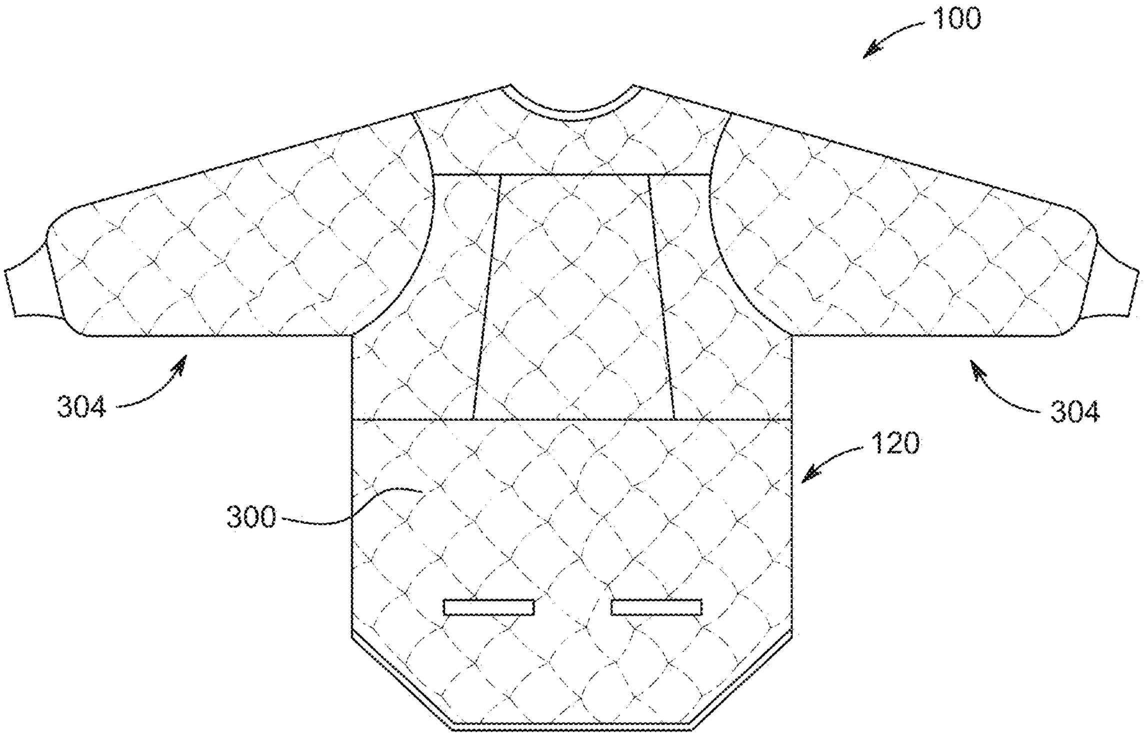
Figure 3C:
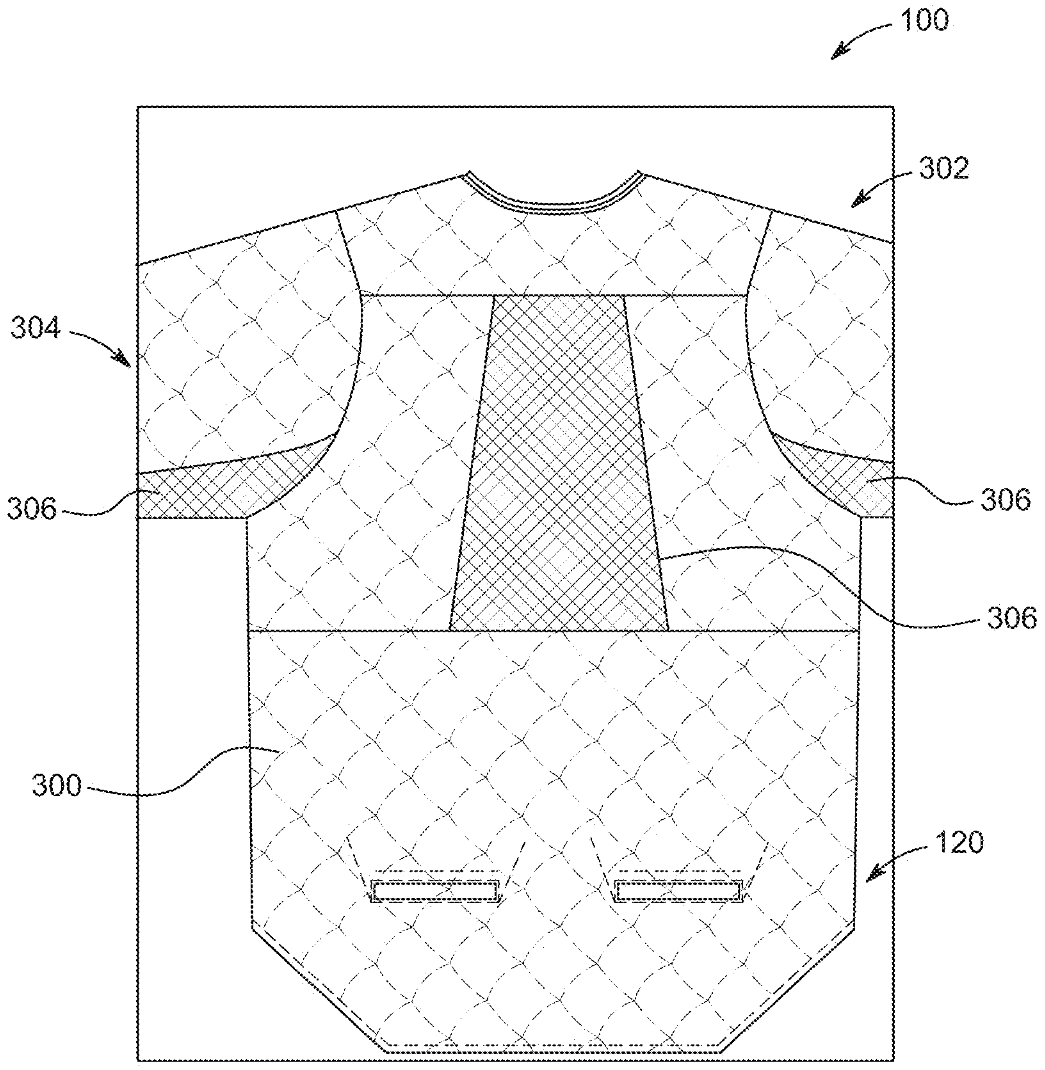
Figure 3D:
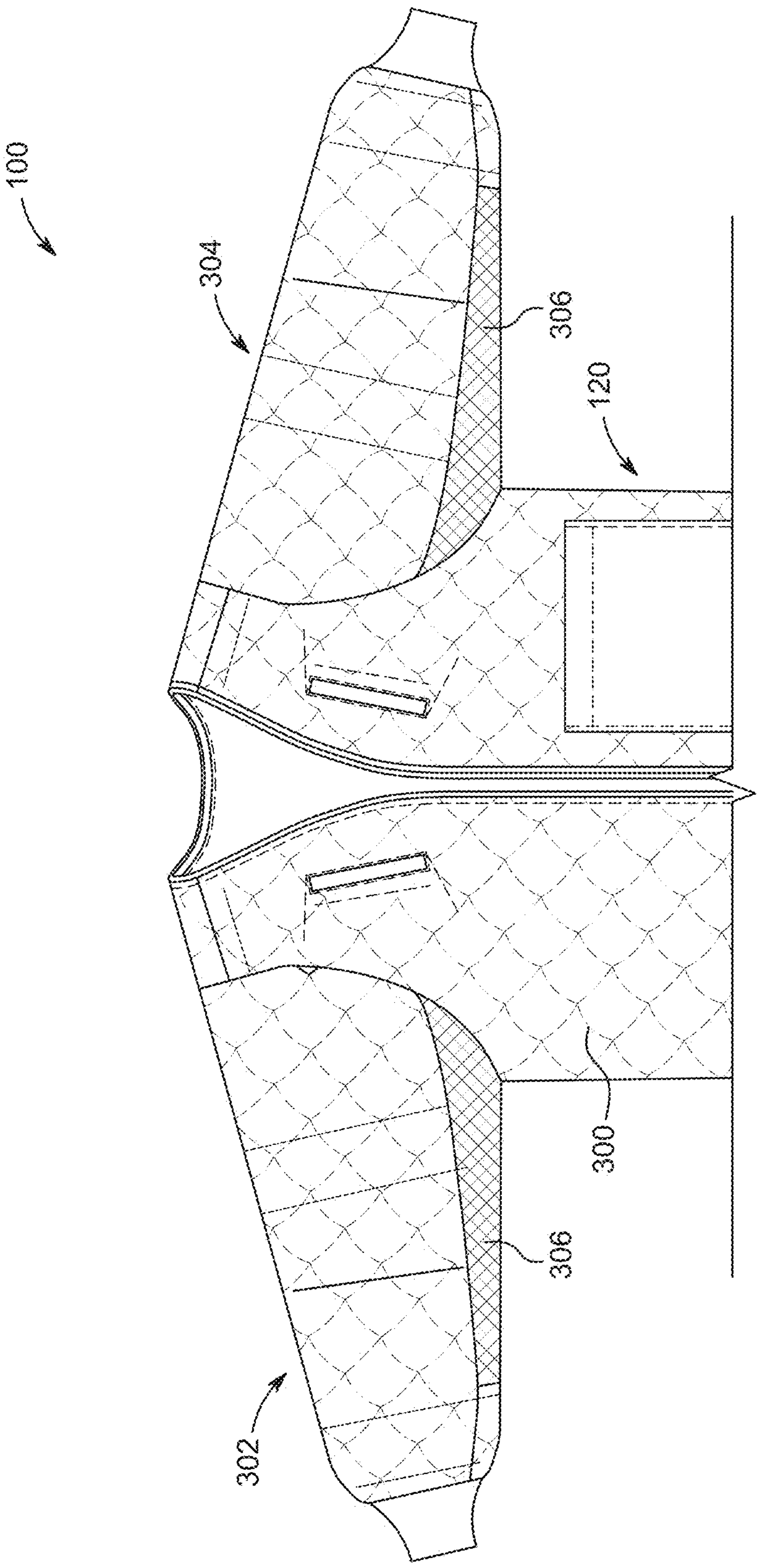

Having thus described certain example embodiments of the present disclosure in general terms, reference will hereinafter be made to the accompanying drawings, which are not necessarily drawn to scale, and wherein:

FIG. 1A illustrates a front view of an outer layer of a protective coat in accordance with an example embodiment of the present disclosure;

FIG. 1B illustrates a rear view of the outer layer of the protective coat in accordance with an example embodiment of the present disclosure;

FIG. 2A illustrates a front view of a moisture barrier layer of the protective coat in accordance with an example embodiment of the present disclosure;

FIG. 2B illustrates a rear view of the moisture barrier layer of the protective coat in accordance with an example embodiment of the present disclosure;

FIG. 2C illustrates a flexible panel of the moisture barrier layer of the protective coat in accordance with an example embodiment of the present disclosure;

FIG. 2D illustrates a flexible panel in a first sleeve portion of the moisture barrier layer in accordance with an example embodiment of the present disclosure;

FIG. 3A illustrates a front view of a thermal layer in the protective coat in accordance with an example embodiment of the present disclosure;

FIG. 3B illustrates a rear view of the thermal layer of the protective coat in accordance with an example embodiment of the present disclosure;

FIG. 3C illustrates the rear view of the thermal layer of the protective coat in accordance with an example embodiment of the present disclosure; and FIG. 3D illustrates the front view of the thermal layer of the protective coat in accordance with an example embodiment of the present disclosure.

DETAILED DESCRIPTION

Some embodiments will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements.

The components illustrated in the figures represent components that may or may not be present in various embodiments of the invention described herein such that embodiments may include fewer or more components than those shown in the figures while not departing from the scope of the invention. Some components may be omitted from one or more figures or shown in dashed line for visibility of the underlying components.

As used herein, the term “comprising” means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases “in various embodiments,” “in one embodiment,” “according to one embodiment,” “in some embodiments,” and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word “example” or “exemplary” is used herein to mean “serving as an example, instance, or illustration.” Any implementation described herein as “exemplary” is not necessarily to be construed as preferred or advantageous over other implementations.

If the specification states a component or feature “may,” “can,” “could,” “should,” “would,” “preferably,” “possibly,” “typically,” “optionally,” “for example,” “often,” or “might” (or other such language) be included or have a characteristic, that a specific component or feature is not required to be included or to have the characteristic. Such a component or feature may be optionally included in some embodiments or it may be excluded.

The present disclosure provides various embodiments of a protective coat. Embodiments may be configured to attach a thermal layer and a moisture barrier layer. Embodiments may be configured to detachably attach an outer layer over an inner layer. Embodiments may be further configured to attach a top side and a bottom side of an overlay panel of a body portion of the moisture barrier layer to a moisture barrier material of the moisture barrier layer. Embodiments may be further configured to detach a left side and a right side of the overlay panel of the body portion of the moisture barrier layer to the moisture barrier material of the moisture barrier layer to provide venting.

Embodiments may be configured to allow ventilation of air through at least a portion of a flexible panel of the moisture barrier layer. Embodiments may be further configured to block particulate matters from entering into the inner layer. Embodiments may be configured to sew the moisture barrier layer to the thermal layer. Embodiments may be configured to position the flexible panel of a first sleeve portion of the thermal layer on an underside of the first sleeve portion of the thermal layer.

FIG. 1A illustrates a front view of an outer layer 110 of a protective coat 100, in accordance with an example embodiment of the present disclosure. FIG. 1B illustrates a rear view of the outer layer 110 of the protective coat 100, in accordance with an example embodiment of the present disclosure.

In some embodiments, the protective coat 100 may correspond to a specialized garment designed to safeguard a wearer from specific hazards in a workplace or environment. The protective garment 100 may be used in various industries and professions where exposure to risks like chemicals, fire, biohazards, or extreme temperatures is common. The protective coat 100 may correspond to a firefighting coat. The wearer may correspond to firefighters. The protective coat 100 may be used by firefighters in high-heat environments. At least a portion of the protective coat 100 may be made from a group of flame-retardant materials including, but is not limited to, Nomex, Kevlar, or carbon fiber blends. The protective coat 100 may protect the wearer against heat, flames, and thermal radiation.

In some embodiments, the protective coat 100 may be essential for protecting the firefighters from injuries caused by high heat, the flames, chemical exposure, and debris. The protective coat 100 may ensure that the firefighters may perform firefighting work efficiently while staying safe and comfortable in life-threatening situations. The protective coat 100 may be designed to safeguard the wearer from hazardous conditions encountered during the firefighting work or other dangerous tasks.

In some embodiments, the protective coat 100 may comprise the outer layer 110. The outer layer 110 may comprise high-visibility reflective strips 102. The high-visibility reflective strips 102 may be sewn onto the outer layer 110 of the protective coat 100. The high-visibility reflective strips 102 may enhance visibility of the protective coat 100 in low-light conditions or smoky conditions. In some embodiments, the outer layer 110 of the protective coat 100 may be equipped with a plurality of pockets 104. The plurality of pockets may correspond to large, and accessible pockets. The plurality of pockets 104 may be used for keeping tools and equipment.

In some embodiments, the outer layer 110 of the protective coat 100 may comprise a high neck collar 106. The high neck collar 106 may be configured to provide additional protection for the firefighters. The high neck collar 106 may shield neck area from radiant heat, direct flames, and hot debris. The high neck collar 106 may minimize the risk of burns to skin. The high neck collar 106 may ensure a continuous protective barrier around the neck. The high neck collar 106 may provide an extra layer of insulation around the neck.

In some embodiments, the outer layer 110 of the protective coat 100 may further comprise a closure strip 108. The closure strip 108 may comprise a zipper and a plurality of snap fasteners. The closure strip 108 may be configured to provide a secure seal to the protective coat 100 to protect the wearer against the heat, the flame, and the debris. In some embodiments, the zipper may be a first layer of the closure strip 108. The zipper may run along a length of a front opening of the outer layer 110 of the protective coat 100. The zipper may provide a strong and continuous seal to keep out the heat, the flame, and the debris out from the protective coat 100.

In some embodiments, the plurality of snap fasteners may be positioned over the zipper. The plurality of snap fasteners may add an additional layer of closure to enhance protection of the wearer. The plurality of snap fasteners may protect the zipper from direct exposure to the heat or damage. The plurality of snap fasteners may ensure that the protective coat 100 may remain closed even if the zipper malfunctions.

In some embodiments, the outer layer 110 may define a body portion 112, a first sleeve portion 114, and a second sleeve portion 116. The outer layer 110 may comprise an overlay panel 122 at the back of the protective coat 100. A top side and a bottom side of the overlay panel 122 may be securely attached to the outer layer 110 of the protective coat 100. A left side and a right side of the overlay panel 122 may be unattached to the outer layer 110 of the protective coat 100. The overlay panel 122 may be configured to effectively allow heat and moisture to escape from the protective coat 100. Further, the first sleeve portion 114, and the second sleeve portion 116 of the outer layer 110 may comprise a vent 118.

FIG. 2A illustrates a front view of a moisture barrier layer 200 of the protective coat 100, in accordance with an example embodiment of the present disclosure. FIG. 2B illustrates a rear view of the moisture barrier layer 200 of the protective coat 100, in accordance with an example embodiment of the present disclosure. FIG. 2C illustrates a flexible panel 222 of the moisture barrier layer 200 of the protective coat 100, in accordance with an example embodiment of the present disclosure. FIG. 2D illustrates a flexible panel 224 in a first sleeve portion 204 of the moisture barrier layer 200, in accordance with an example embodiment of the present disclosure.

In some embodiments, the protective coat 100 may further comprise an inner layer. The inner layer may comprise a thermal layer 120 (shown in FIG. 1A) and the moisture barrier layer 200. The moisture barrier layer 200 may be positioned over and attached to the thermal layer 120. The moisture barrier layer 200 may define a body portion 202, a first sleeve portion 204, and a second sleeve portion 206. Each of the body portion 202, the first sleeve portion 204, and the second sleeve portion 206 of the moisture barrier layer 200 may comprise a moisture barrier material, a flexible panel 222 attached to the moisture barrier material and an overlay panel 212. The overlay panel 212 may be positioned over the flexible panel 222 and may be attached to the moisture barrier material.

In some embodiments, the body portion 202 may correspond to a central section of the moisture barrier layer 200 that may cover and protect an upper body of the firefighter. The body portion 202 may be configured to provide a barrier against moisture while maintaining flexibility and breathability. The body portion 202 may include the flexible panel 222 and the overlay panel 212 to enhance mobility, ventilation, and durability. In some embodiments, the first sleeve portion 204 may correspond to a section of the moisture barrier layer 200 that may correspond to a first arm of the wearer. The first sleeve portion 204 may be shaped to fit the first arm and may include moisture-resistant materials along with the overlay panel 212 to allow ease of movement while ensuring that the first arm may remain protected from water and dust particulates. Further, the second sleeve portion 206 may correspond to a counterpart to the first sleeve portion 204. The second sleeve portion 206 may cover a second arm of the wearer. Similar to the first sleeve portion 204, the second sleeve portion 206 may be configured to provide mobility, protection, and ventilation.

In some embodiments, the moisture barrier material may be configured to protect the wearer from external liquid. The external liquid may comprise water, chemicals, and other hazardous fluids. The moisture barrier material may be further configured to allow moisture vapor to escape. The moisture vapor may correspond to sweat. The moisture barrier material may be waterproof and breathable. In some embodiments, the moisture barrier material may prevent the external liquid from entering the protective coat 100. The moisture barrier material may further ensure that the wearer may stay dry even in water sprays from hoses or high-humidity environments.

In some embodiments, the flexible panel 222 may correspond to a piece of pliable material integrated into the moisture barrier layer 200 to allow greater freedom of movement in high-mobility areas. The high-mobility areas may include, but is not limited to, shoulders, elbows, underarms, and back. The flexible panel 222 may be configured to retain the waterproof and the breathable properties of the moisture barrier layer 200 and may also increase flexibility of the protective coat 100.

In some embodiments, the overlay panel 212 may correspond to a protective layer positioned over the flexible panel 222 and attached to the moisture barrier material (shown in FIG. 2B). The overlay panel 212 may cover and protect the flexible panel 222 from wear, tear, and abrasion. In some embodiments, a top side 214 and a bottom side 216 of the overlay panel 212 of the body portion 202 of the moisture barrier layer 200 may be attached to the moisture barrier material of the moisture barrier layer 200. The top side 214 and the bottom side 216 of the overlay panel 212 of the body portion 202 may be attached to the moisture barrier material to ensure stability and alignment of the overlay panel 212 with the body portion 202 of the moisture barrier layer 200. The top side 214 and the bottom side 216 of the overlay panel 212 of the body portion 202 may be further attached to the moisture barrier material to ensure reinforcement of the body portion 202.

In some embodiments, a left side 218 and a right side 220 of the overlay panel 212 of the body portion 202 of the moisture barrier layer 200 may be unattached to the moisture barrier material of the moisture barrier layer 200 to provide venting. The left side 218 and the right side 220 of the overlay panel 212 may be unattached to the moisture barrier material to create opening along edge of the left side and the right side. The opening on the left side 218 and the right side 220 of the overlay panel 212 may allow for ventilation. The overlay panel 212 may be located on the body portion 202 of the moisture barrier layer 200. The overlay panel 212 may be located on the back of the moisture barrier layer 200 where the heat and moisture tend to build up during the firefighting work. In some embodiments, the left side 218 and the right side 220 of the overlay panel 212 of the body portion 202 of the moisture barrier layer 200 may be unattached to the moisture barrier material of the moisture barrier layer 200 to allow ventilation of air through at least a portion of the flexible panel 222 of the moisture barrier layer 200. The unattached left side 218 and the right side 220 of the overlay panel 212 may create the vent that may allow the air to flow through the flexible panel 222.

In one example, when the wearer is actively working in a hot and humid environment, the left side 218 and the right side 220 of the overlay panel 212 may allow fresh air to enter the overlay panel 212 and further allow the heat and the moisture vapor to escape. The overlay panel 212 may prevent overheating of the wearer or the protective coat 100.

In some embodiments, the first sleeve portion 204 and the second sleeve portion 206 of the moisture barrier layer 200 comprises an overlay panel 208. A proximal side of the overlay panel 208 of the first sleeve portion 204 of the moisture barrier layer 200 may be attached to the moisture barrier material of the moisture barrier layer 200. The proximal side of the overlay panel 208 may correspond to the side of the overlay panel 212 that may be closer to the body portion 202 of the protective coat 100. The proximal side of the overlay panel 208 may be near to the shoulder or the under arm area.

In some embodiments, a distal side of the overlay panel 208 of the first sleeve portion 204 of the moisture barrier layer 200 may be unattached to the moisture barrier material of the moisture barrier layer 200 to allow ventilation of the air through at least a portion of the flexible panel 224 of the first sleeve portion 204 of the moisture barrier layer 200. The distal side of the overlay panel 208 of the first sleeve portion 204 may correspond to the side of the overlay panel 208 that may be farther from the body portion 202. The distal side of the overlay panel 208 of the first sleeve portion 204 may be positioned near wrist or the bottom end of the first sleeve portion 204. The distal side of the overlay panel 208 of the first sleeve portion 204 may further correspond to a lower part of the first sleeve portion 204, where the overlay panel 208 may allow for air movement or the ventilation.

In some embodiments, each of the flexible panel 222 of the body portions 202, the first sleeve portions 204, and the second sleeve portion 206 of the moisture barrier layer 200 may be breathable and may be configured to block particulate matters from entering into the inner layer. The flexible panel 222 may be made from a group of materials that may allow the moisture vapor to escape from inside the protective coat 100 while preventing the external liquid or the particulate matters from entering the protective coat 100. The particulate matters may comprise, but is not limited to, dust, soot, ash, the debris or toxic particles. The flexible panel 222 may use semi-permeable membranes or advanced fabrics that may facilitate vapor transmission but block larger particles.

In one example, the wearer may enter a burning building where smoke and soot may fill the air. The breathable flexible panel 222 may allow the body heat and the sweat to escape, and may keep the wearer cool and more comfortable. Further, the flexible panel 222 may block the particulate matters from entering the inner layer of the protective coat 100.

In some embodiments, a vent 210 may be positioned in the first sleeve portion 204 of the moisture barrier layer 200. The vent 210 may be formed because of the distal side of the overlay panel 208 of the first sleeve portion 204 of the moisture barrier layer 200 may be unattached to the moisture barrier material of the moisture barrier layer 200. The vent 210 may be configured to improve airflow and provide ventilation within the first sleeve portion 204. The vent 210 may be tactically located to allow air circulation through the first sleeve portion 204. In some embodiments, vent 210 may be positioned in the second sleeve portion 206 of the moisture barrier layer 200. The vent 210 may enhance breathability and may reduce heat buildup during intense physical activity. By incorporating the vent 210 in the first sleeve portion 204, the protective coat 100 may ensure that excess heat and moisture may escape, and may help to regulate microclimate within the protective coat 100 while maintaining protective integrity of the moisture barrier layer 200.

FIG. 3A illustrates a front view of the thermal layer 120 in the protective coat 100, in accordance with an example embodiment of the present disclosure. FIG. 3B illustrates a rear view of the thermal layer 120 of the protective coat 100, in accordance with an example embodiment of the present disclosure. FIG. 3C illustrates the rear view of the thermal layer 120 of the protective coat 100, in accordance with an example embodiment of the present disclosure. FIG. 3D illustrates the front view of the thermal layer 120 of the protective coat 100, in accordance with an example embodiment of the present disclosure.

In some embodiments, the thermal layer 120 may define a body portion 300, a first sleeve portion 302, and a second sleeve portion 304. Each of the body portion 300, the first sleeve portion 302, and the second sleeve portion 304 of the thermal layer 120 may comprise a thermal material and a flexible panel 306 attached to the thermal material. In some embodiments, the thermal layer 120 of the protective coat 100 may be configured to provide heat insulation and may ensure that the wearer may be protected from extreme temperatures while maintaining mobility. The thermal layer 120 may prevent transfer of the heat from external environment to the body of the wearer.

In some embodiments, the body portion 300 of the thermal layer 120 may correspond to a central section that may cover the upper body of the wearer. The body portion 300 may be designed using the thermal material and may include the flexible panel 306 to balance heat insulation and mobility. The body portion 300 may be configured to shield the wearer's chest, back, and abdomen from extreme temperatures, preventing heat transfer from the external environment to the body of the wearer while allowing sufficient flexibility for movement during the firefighting task. In some embodiments, the first sleeve portion 302 of the thermal layer 120 may correspond to a section of the thermal layer 120 that may further correspond to the first arm of the wearer. The first sleeve portion 302 may be tailored with the thermal material to provide protection against heat and may ensure freedom of movement for arm-related tasks. Further, the second sleeve portion 304 of the thermal layer 120 may be an equivalent section designed for the second arm. The second sleeve portion 304 may incorporate the thermal material to provide heat insulation and mobility.

In some embodiments, the flexible panel 306 may be positioned within the thermal layer 120 to enhance flexibility to the wearer. The thermal layer 120 may provide flexibility to the shoulders, elbows, and arms of the wearer. The shoulders may require the flexibility for twisting or bending movements. Further, the elbows and arms may require the flexibility for lifting, reaching, or other dynamic actions.

In some embodiments, the outer layer 110 may be detachably attached over the inner layer. The outer layer 110 may be detached from the inner layer for cleaning purposes. The cleaning of the outer layer 110 may be required as the outer layer 110 may be exposed to dirt, debris, and physical damage. The outer layer 110 may be detached for separate washing purposes.

In some embodiments, each of the flexible panel 306 of the body portion 300, the first sleeve portion 302, and the second sleeve portion 304 of the thermal layer 120 may comprise aromatic polyamide fibers. The aromatic polyamide fibers may comprise Nomex. In some embodiments, the moisture barrier layer 200 may be sewn to the thermal layer 120. Sewing process may securely join the moisture barrier layer 200 and the thermal layer 120. In some embodiments, each of the flexible panels of the body portions of the thermal barrier layer 120 and the moisture barrier layer 200 may have a trapezoid shape. The trapezoid shape may allow for wider coverage at the top side and may taper down towards waist. The trapezoid shape may maximize protection and may reduce unnecessary bulk in areas with less movement. The wider top side may accommodate dynamic movements of the upper body. The dynamic movements of the upper body may include, but is not limited to, twisting, bending, and reaching. The narrower bottom may reduce overlap of the thermal material and the moisture barrier material. The narrower bottom may further ensure that the thermal layer 120 and the moisture barrier layer 200 may not bunch up or restrict the mobility of the wearer during the firefighting work.

In some embodiments, a length of the flexible panel 306 of the first sleeve portion 302 of the thermal layer 120 may be at least 80% of a length of the first sleeve portion 302 of the thermal layer 120. The length of the flexible panel 306 in the first sleeve portion 302 of the thermal layer 120 may be at least 80% of the total length of the first sleeve portion 302 to ensure maximum flexibility and coverage throughout the arm.

In some embodiments, a length of the flexible panel 306 of the body portion 300 of the thermal layer 120 may be at least 20% of a length of the body portion 300 of the thermal layer 120. By covering at least 20% of the length of the body portion 300, the flexible panel 306 may be positioned in areas requiring greater mobility. The areas requiring greater mobility may include, but is not limited to, the shoulder and the back. The areas requiring greater mobility may be involved in the bending, the twisting, and the reaching movement.

In some embodiments, the flexible panel 306 of the first sleeve portion 302 of the thermal layer 120 may be positioned on an underside of the first sleeve portion 302 of the thermal layer 120. Positioning the flexible panel 306 on the underside of the first sleeve portion 302 of the thermal layer 120 may optimize the mobility and the comfort for the wearer. The underside of the first sleeve portion 302 may be a high-movement area. By placing the flexible panel 306 in the underside of the first sleeve portion 302, the protective coat 100 may accommodate the movements more effectively.

In some embodiments, each of the flexible panel 222 of the body portions 202, the first sleeve portions 204, and the second sleeve portion 206 of the moisture barrier layer 200 may have a flame resistance that may meet or exceed flame resistance requirements for ASTM D6413. The ASTM D6413 standard may measure the flame resistance by evaluating one or more factors. The one or more factors may include, but is not limited to, after-flame time, and after-glow time. The one or more factors may indicate how a material may react when exposed to a flame. The flexible panels may meet or exceed the ASTM D6413 standard to ensure that the flexible panels may not catch fire, melt, or degrade during exposure to intense heat or direct flames. The ASTM D6413 standard may ensure that the wearer may remain protected, even in the high-risk situations.

In some embodiments, the ASTM D6413 standard may require that the flexible panel 222 in the moisture barrier layer 200 may exhibit a charred length of not more than 100 mm (4 inches). Exhibiting the charred length of not more than 100 mm (4 inches) may correspond to the portion of the protective coat 100 destroyed by the flame may remain minimal after exposure to a controlled methane flame for 12 seconds. In some embodiments, the flexible panel 222 may have a post-incandescence time of not more than 2 seconds. Post-incandescence time of not more than 2 seconds may ensure that any visible glow or heat radiation may stop almost immediately after the flame is removed.

In some embodiments, each of the flexible panel 222 of the body portions 202, the first sleeve portion 204, and the second sleeve portion 206 of the moisture barrier layer 200 may have an air permeability that may be at least 4 Cubic Feet per Minute (CFM) that may meet or exceed air permeability requirements for ASTM D737. The ASTM D737 may correspond to a standard for testing the fabric airflow. The ASTM D737 may ensure that the flexible panel 222 may allow sufficient airflow to enhance breathability, reduce heat buildup and improve moisture regulation inside the protective coat 100. By adhering to the ASTM D737 standard, the flexible panel 222 may balance airflow, protection, and durability, of the wearer.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A protective coat comprising:

an inner layer comprising:

a thermal layer that defines a body portion, a first sleeve portion, and a second sleeve portion, wherein each of the body portion, the first sleeve portion, and the second sleeve portion of the thermal layer comprise:

a thermal material; and a flexible panel attached to the thermal material; and a moisture barrier layer that is positioned over and attached to the thermal layer, wherein the moisture barrier layer defines a body portion, a first sleeve portion, and a second sleeve portion, wherein each of the body portion, the first sleeve portion, and the second sleeve portion of the moisture barrier layer comprise:

a moisture barrier material;

a second flexible panel attached to the moisture barrier material and separate from the thermal layer; and an overlay panel that is positioned over the second flexible panel and attached to the moisture barrier material; and an outer layer detachably attached over the inner layer.

2. The protective coat of claim 1, wherein:

a top side and a bottom side of the overlay panel of the body portion is attached to the moisture barrier material of the moisture barrier layer, and a left side and a right side of the overlay panel of the body portion is unattached to the moisture barrier material of the moisture barrier layer to provide venting.

3. The protective coat of claim 1, wherein:

a proximal side of an overlay panel of the first sleeve portion of the moisture barrier layer is attached to the moisture barrier material of the moisture barrier layer, and a distal side of the overlay panel of the first sleeve portion of the moisture barrier layer is unattached to the moisture barrier material of the moisture barrier layer to allow ventilation of air through at least a portion of the flexible panel of the first sleeve portion of the moisture barrier layer.

4. The protective coat of claim 1, wherein each of the body portion, the first sleeve portion, and the second sleeve portion of the moisture barrier layer include the second flexible panel and are breathable and configured to block particulate matters from entering into the inner layer.

5. The protective coat of claim 1, wherein each of the flexible panels of the body portions, the first sleeve portions, and the second sleeve portions of the moisture barrier layer:

has a flame resistance that meets or exceeds flame resistance requirements for Advancing Standards Transforming Markets (ASTM) D6413 (February 2025); and has an air permeability that is at least 4 cubic feet per minute (CFM) or meets or exceeds air permeability requirements for ASTM D737 (February 2025).

6. The protective coat of claim 1, wherein each of the body portion, the first sleeve portion, and the second sleeve portion of the thermal barrier layer include the second flexible panel and comprise aromatic polyamide fibers.

7. The protective coat of claim 1, wherein the moisture barrier layer is sewn to the thermal layer.

8. The protective coat of claim 1, wherein each of the body portion of the thermal barrier layer and the moisture barrier layer include the second flexible panel and have a trapezoid shape.

9. The protective coat of claim 1, wherein a length of the first sleeve portion of the thermal layer including the second flexible panel is at least 80% of a length of the first sleeve portion of the thermal layer.

10. The protective coat of claim 1, wherein a length of the body portion of the thermal layer including the second flexible panel is at least 20% of a length of the body portion of the thermal layer.

11. The protective coat of claim 1, wherein the first sleeve portion of the thermal layer including the second flexible panel is positioned on an underside of the first sleeve portion of the thermal layer.

12. The protective coat of claim 1, wherein the protective coat is a firefighting coat.

13. A method comprising: positioning a moisture barrier layer over a thermal layer, wherein the thermal layer defines a body portion, a first sleeve portion, and a second sleeve portion, wherein each of the body portion, the first sleeve portion, and the second sleeve portion of the thermal layer comprise: a thermal material; and a flexible panel attached to the thermal material, and a moisture barrier layer that is positioned over and attached to the thermal layer, wherein the moisture barrier layer defines a body portion, a first sleeve portion, and a second sleeve portion, and wherein each of the body portion, the first sleeve portion, and the second sleeve portion of the moisture barrier layer comprise: a moisture barrier material; a second flexible panel attached to the moisture barrier material and separate from the thermal layer; and an overlay panel that is positioned over the second flexible panel and attached to the moisture barrier material; and an outer layer detachably attached over the inner layer.

14. The method of claim 13, further comprising: attaching a top side and a bottom side of the overlay panel of the body portion is attached to the moisture barrier material of the moisture barrier layer; and detaching a left side and a right side of the overlay panel of the body portion to the moisture barrier material of the moisture barrier layer to provide venting.

15. The method of claim 13, further comprising attaching a proximal side of an overlay panel of the first sleeve portion of the moisture barrier layer to the moisture barrier material of the moisture barrier layer.

16. The method of claim 15, further comprising detaching, a distal side of the overlay panel of the first sleeve portion of the moisture barrier layer to the moisture barrier material of the moisture barrier layer to allow ventilation of air through at least a portion of the flexible panel of the first sleeve portion of the moisture barrier layer.

17. The method of claim 13, wherein each of the flexible panels of the body portions, the first sleeve portions, and the second sleeve portions of the moisture barrier layer include the second flexible panel and are breathable and configured to block particulate matters from entering into the inner layer.

18. The method of claim 13, wherein each of the flexible panels of the body portions, the first sleeve portions, and the second sleeve portions of the moisture barrier layer: has a flame resistance that meets or exceeds flame resistance requirements for Advancing Standards Transforming Markets (ASTM) D6413 (February 2025); and has an air permeability that is at least 4 cubic feet per minute (CFM) or meets or exceeds air permeability requirements for ASTM D737 (February 2025).

* * * * *